United States Patent
Kushner

(10) Patent No.: US 11,255,345 B2
(45) Date of Patent: Feb. 22, 2022

(54) METHOD AND ARRANGEMENT TO MINIMIZE NOISE AND EXCITATION OF STRUCTURES DUE TO CAVITY ACOUSTIC MODES

(71) Applicant: Elliott Company, Jeannette, PA (US)

(72) Inventor: Francis Kushner, Delmont, PA (US)

(73) Assignee: Elliott Company, Jeannette, PA (US)

( * ) Notice: Subject to any disclaimer, the term of this patent is extended or adjusted under 35 U.S.C. 154(b) by 93 days.

(21) Appl. No.: 16/477,971

(22) PCT Filed: Mar. 5, 2018

(86) PCT No.: PCT/US2018/020880
§ 371 (c)(1),
(2) Date: Jul. 15, 2019

(87) PCT Pub. No.: WO2018/161069
PCT Pub. Date: Sep. 7, 2018

(65) Prior Publication Data
US 2019/0331134 A1    Oct. 31, 2019

Related U.S. Application Data

(60) Provisional application No. 62/501,852, filed on May 5, 2017, provisional application No. 62/466,774, filed on Mar. 3, 2017.

(51) Int. Cl.
*F04D 29/66* (2006.01)
*F01D 5/14* (2006.01)
(Continued)

(52) U.S. Cl.
CPC ............ *F04D 29/661* (2013.01); *F01D 5/141* (2013.01); *F04D 29/403* (2013.01); *F04D 29/68* (2013.01);
(Continued)

(58) Field of Classification Search
CPC ...... F04D 29/403; F04D 29/66; F04D 29/661; F04D 29/68; F05D 2260/96; F05D 2260/961
See application file for complete search history.

(56) References Cited

U.S. PATENT DOCUMENTS

| 4,063,848 A | 12/1977 | Wiggins et al. |
| 4,212,585 A | 7/1980 | Swarden et al. |

(Continued)

FOREIGN PATENT DOCUMENTS

| DE | 102015209666 A1 | 12/2016 |
| EP | 0280205 A2 | 2/1988 |

(Continued)

OTHER PUBLICATIONS

Rao et al., "Active Flow Control to Reduce Fan Blade Vibration and Noise", American Institute of Aeronautics and Astronautics, 1999, pp. 57-65.
(Continued)

*Primary Examiner* — Brian P Wolcott
(74) *Attorney, Agent, or Firm* — The Webb Law Firm

(57) ABSTRACT

An arrangement for intentionally mistuning a cavity formed adjacent an impeller in a turbomachine, the arrangement including at least two bladed elements defined within a perimeter of a casing wall adjacent the impeller, wherein the bladed elements are configured to mistune cavity acoustic modes to minimize acoustic pulsations in the cavity.

19 Claims, 6 Drawing Sheets

(51) Int. Cl.
 *F04D 29/40* (2006.01)
 *F04D 29/68* (2006.01)
(52) U.S. Cl.
 CPC .. *F05D 2250/294* (2013.01); *F05D 2260/961* (2013.01)

(56) References Cited

U.S. PATENT DOCUMENTS

| | | | |
|---|---|---|---|
| 5,466,118 | A | 11/1995 | Heinrich |
| 6,435,819 | B2 * | 8/2002 | Irie ................. F01D 5/145 415/119 |
| 6,601,672 | B2 * | 8/2003 | Liu ................ F04D 29/4213 181/213 |
| 6,619,909 | B2 * | 9/2003 | Barnett ............... F04D 27/02 415/119 |
| 7,500,299 | B2 | 3/2009 | Dupeux et al. |
| 7,775,758 | B2 | 8/2010 | Legare |
| 8,397,506 | B1 | 3/2013 | Wright et al. |
| 9,086,002 | B2 * | 7/2015 | Konig ............... F04D 29/665 |
| 9,581,034 | B2 * | 2/2017 | Kushner .............. F04D 29/544 |
| 9,644,639 | B2 * | 5/2017 | Duong ............... F04D 23/008 |
| 10,119,554 | B2 * | 11/2018 | Liu .................. F04D 29/665 |
| 10,655,642 | B2 | 5/2020 | Puzik et al. |

| | | | |
|---|---|---|---|
| 2002/0004002 | A1 | 1/2002 | Irie et al. |
| 2003/0138317 | A1 | 7/2003 | Barnett et al. |
| 2005/0111968 | A1 | 5/2005 | Lapworth |
| 2008/0199306 | A1 | 8/2008 | Lebret |
| 2009/0246007 | A1 | 10/2009 | Johann |
| 2013/0025967 | A1 | 1/2013 | Seib |
| 2014/0020975 | A1 | 1/2014 | König |
| 2015/0211545 | A1 | 7/2015 | Duong et al. |
| 2015/0267538 | A1 | 9/2015 | Rice |
| 2015/0330225 | A1 | 11/2015 | Duong et al. |

FOREIGN PATENT DOCUMENTS

| | | |
|---|---|---|
| EP | 3018361 A1 | 5/2016 |
| JP | H361198 A | 3/1991 |
| JP | H381599 A | 4/1991 |
| JP | 2002147789 A | 5/2002 |
| JP | 200657487 A | 3/2006 |
| JP | 201025000 A | 2/2010 |

OTHER PUBLICATIONS

Tyler et al., "Axial Flow Compressor Noise Studies", SAE Transactions, 1962, pp. 309-332.

* cited by examiner

METHOD AND ARRANGEMENT TO MINIMIZE NOISE AND EXCITATION OF STRUCTURES DUE TO CAVITY ACOUSTIC MODES

CROSS-REFERENCE TO RELATED APPLICATIONS

This application is the United States national phase of International Application No. PCT/US2018/020880 filed Mar. 5, 2018, and claims the benefit of U.S. Provisional Patent Nos. 62/466,774 and 62/501,852 filed Mar. 3, 2017 and May 5, 2017, respectively, the disclosures of which are hereby incorporated by reference in their entirety.

BACKGROUND OF THE INVENTION

Field of the Invention

The present disclosure relates, generally to turbomachines and other mechanisms and, more particularly, to blade-like element arrangements for cavities within a turbomachine adapted for reducing rotor disk excitation using intentional mistuning.

Description of Related Art

Turbomachines, such as centrifugal flow compressors, axial flow compressors, and turbines may be utilized in various industries. Centrifugal flow compressors and turbines, in particular, have a widespread use in power stations, jet engine applications, gas turbines, and automotive applications. Centrifugal flow compressors and turbines are also commonly used in large-scale industrial applications, such as air separation plants and hot gas expanders used in the oil refinery industry. Centrifugal compressors are further used in large-scale industrial applications, such as refineries and chemical plants.

With reference to FIG. 1, a multi-stage, centrifugal-flow turbomachine 10 is illustrated in accordance with a conventional design. In some applications, a single stage may be utilized. In other applications, multiple stages may be utilized. Such a turbomachine 10 generally includes a shaft 20 supported within a housing 30 by a pair of bearings 40. Turbomachine 10 shown in FIG. 1 includes a plurality of stages to progressively increase the fluid pressure of the working fluid. Each stage is successively arranged along the longitudinal axis of turbomachine 10 and all stages may or may not have similar components operating on the same principle.

With continued reference to FIG. 1, an impeller 50 includes a plurality of rotating blades 60 circumferentially arranged and attached to an impeller hub 70 which is in turn attached to shaft 20. Blades 60 may be optionally attached to a cover disk 65. A plurality of impellers 50 may be spaced apart in multiple stages along the axial length of shaft 20. Rotating blades 60 are fixedly coupled to impeller hub 70 such that rotating blades 60 along with impeller hub 70 rotate with the rotation of shaft 20. Rotating blades 60 rotate downstream of a plurality of stationary vanes or stators 80 attached to a stationary tubular casing. The working fluid, such as a gas mixture, enters and exits turbomachine 10 in the axial direction of shaft 20. Energy from the working fluid causes a relative motion of rotating blades 60 with respect to stators 80. In a centrifugal compressor, the cross-sectional area between rotating blades 60 within impeller 50 decreases from an inlet end to a discharge end, such that the working fluid is compressed as it passes across impeller 50.

Referring to FIG. 2, working fluid, such as a gas mixture, moves from an inlet end 90 to an outlet end 100 of turbomachine 10. A row of stators 80 provided at inlet end 90 channels the working fluid into a row of rotating blades 60 provided at outlet end 100 of turbomachine 10. Stators 80 extend within the casing for channeling the working fluid to rotating blades 60. Stators 80 are spaced apart circumferentially with equal spacing between individual struts around the perimeter of the casing. A diffuser 110 is provided at the outlet of rotating blades 60 for homogenizing the fluid flow coming off rotating blades 60. Diffuser 110 optionally has a plurality of diffuser vanes 120 extending within a casing. Diffuser blades 120 are spaced apart circumferentially, typically with equal spacing between individual diffuser blades 120 around the perimeter of the diffuser casing. In a multi-stage turbomachine 10, a plurality of return channel vanes 125 are provided at outlet end 100 of a fluid compression stage for channeling the working fluid to rotating blades 60 of the next successive stage. In such an embodiment, the return channel vanes 125 provide the function of stators 80 from the first stage of turbomachine 10. The last impeller in a multi-stage turbomachine typically only has a diffuser, which may be provided with or without the diffuser vanes. The last diffuser channels the flow of working fluid to a discharge casing (volute) having an exit flange for connecting to the discharge pipe. In a single-stage embodiment, turbomachine 10 includes stators 80 at inlet end 90 and diffuser 110 at outlet end 100.

An important concern in designing turbomachines is controlling the vibration of the rotating blades and the hub throughout the operating range of the turbomachine. Rotating blades and disks in turbomachinery are excited into resonant vibrations by a) upstream stator strut and/or vane wakes and potential flow interaction with downstream struts and vanes, b) other inhomogeneities in the flow stream formed by non-uniform circumferential pressure distribution, c) acoustic pulsations either at rotating blade passing frequency and/or d) vortex shedding from stationary vanes, in turn causing coincident acoustic resonance of the gas within the casing. For example, Tyler/Sofrin modes may occur due to sound waves at blade passing frequency reflecting off vanes giving spinning modes. (Ref. Tyler, J. M., and Sofrin, T. G., 1962, "Axial Flow Compressor Noise Studies", SAE Transactions, Vol. 70, pp. 309-332.) The acoustic pulsations at the spinning mode in turn can match the mode shape and frequency of the acoustic mode of the cavity at the sides of the impeller, and also match the mode of the impeller structure. This is termed triple coincidence. The acoustic pulsations reflect differently off of the stator struts set back further from the impeller and reduce the effective amplitude of the spinning modes. For example, in an impeller having 15 rotating blades and 20 stator struts, there is a 5-diameter spinning mode at blade passing frequency 15 times the rotor speed. If the 5-diameter structural mode is equal to 20 times the rotating speed, the blade excitation can be lowered by setting half of the stator struts downstream about one-half an acoustic wave length, as wave reflections would result in phase cancellation. One example of such an arrangement is disclosed in U.S. Pat. No. 9,581,034.

These excitations cause cyclic stress, resulting in potentially high cycle fatigue and failure in impellers either at rotating blades, the hub, or the cover. The impeller can be excited to a large amplitude when a modal frequency corresponds to shaft rotational frequency multiplied by the harmonic number of the flow inhomogeneity seen by the blades. Typically, the number of resonances with an amplitude large enough to cause high cycle fatigue is limited. Since the damage rate from fatigue occurs only if infinite endurance strength of the material is breached, a modest reduction in the vibration amplitude often will eliminate high cycle fatigue as the limiting factor for blade and disk life.

If a critical resonance cannot be avoided, one current practice to overcome these problems is to avoid operation at the resonant frequency by changing the speed rapidly when a resonance is encountered, thereby minimizing the number of fatigue cycles that a blade accumulates during operation. If the number of vibration cycles is minimized, then blade failure is controlled by mechanisms other than downstream wakes, acoustic pulsations, flow inhomogenities, or vortex shedding. However, this practice places undesirable limits on operation of turbomachinery.

Another current approach is to reduce the spatial variations in the flow field by directly injecting fluid into low-velocity wakes behind obstructions (Rao, N. M., Feng, J., Burdisso, R. A, and Ng, W. F., "Active Flow Control to Reduce Fan Blade Vibration and Noise", 5.sup.th AIAA/CEAS Aeroacoustic Conference, American Institute of Aeronautics and Astronautics, May 10-12, 1999). This approach requires the use of either fluid from the compressor or from an additional external fluid source in relatively large quantities. Use of compressor fluid has a detrimental impact on performance. The addition of a separate fluid supply adds weight and requires additional power. Both methods have detrimental impacts on performance of the turbomachinery. Also, wake filling does not address modal excitation due to bow waves from downstream flow obstructions.

In recent years, it has been discovered that besides non-uniform flow excitation, such as from stator wakes, acoustic pressure pulsation can be a concern at least for high pressure centrifugal compressor impellers. This has been termed "triple coincidence" and explains rare failures and likely a reason, at least partially, for some previous undocumented failures. Bladed disk interaction resonance can be avoided for centrifugal impellers as needed, depending on vibratory mode involved, available damping, and potential excitation level. Especially for stages having vanes in the diffuser near impeller tips, concern for high cycle fatigue is very high as certain numbers of vanes combined with a number of rotating blades can give a correct phase to excite a highly responding mode. A similar but more complex interaction is with transverse acoustic modes having a specific number of nodal diameters. In this case, acoustic gas modes in cavities at sides of impellers, matching rotating acoustic pulsations at impeller blade passing frequency termed Tyler/Sofrin modes, and a matching structural impeller mode give the triple coincidence causing higher resonant response of the impeller, besides increased noise. The concern for this coincidence is often difficult to evaluate and to correct unless there is a known failure to modify number of vanes or blades. This coincidence can add to the direct response from either upstream wakes or downstream diffuser vane interacting flow pulsations. Dimensions of impeller side cavities are axisymmetric and are set by aerodynamics, so that outer and inner radii define transverse modes with small radial dimensional changes available. Often a minor aerodynamic performance compromise can be used to change designs to avoid serious resonances, e.g. numbers of vanes and blades, changing the response of a matching diameter mode or have a different less responsive mode to alleviate concern. Besides turbomachinery, e.g. compressors and pumps, the methods as described could be utilized for any cavity that has diametrical mode shapes, or possibly other patterns of pressure pulsation frequencies. These modification(s) can alleviate if not eliminate concern for any mechanism having structural vibration and/or environmental noise issues.

SUMMARY OF THE INVENTION

In one aspect of the disclosure, an arrangement for intentionally mistuning a cavity formed adjacent an impeller hub and/or another cavity formed when there is an impeller cover on a turbomachine having "n"-diameter acoustic modes includes at least two bladed elements defined within a perimeter of a casing wall adjacent the impeller. The bladed elements are configured to mistune the cavities to minimize acoustic pulsations in the cavity.

In another aspect, two times "n" bladed elements may be defined in the casing wall, wherein "n" is the n-diameter cavity mode that is to be mistuned. The bladed elements may be grooves or ridges defined in the casing wall. For example, of an n-diameter mode where "n"=5, at least 20 bladed elements may be defined in the casing wall. Ten bladed elements may have a depth greater than the other ten adjacent bladed elements. Ten bladed elements may have a width greater than the other ten adjacent bladed elements. The bladed elements may be spaced equidistant from one another. The bladed elements may be defined in the casing wall on a hub side of the impeller. The bladed elements may be defined in the casing wall on a cover side of the impeller.

In another aspect, a turbomachine includes a casing having an inlet end opposite an outlet end along a longitudinal axis of the casing, a shaft assembly provided within the casing, the shaft assembly extending from the inlet end to the outlet end, a rotor having a plurality of rotating impellers extending radially outward from the shaft assembly, and at least two bladed elements defined within a perimeter of the casing adjacent one of the impellers. The bladed elements are configured to mistune at least one cavity adjacent to the impeller to minimize acoustic pulsations in the cavity for an n-diameter mode.

In another aspect, the bladed elements may be grooves or ridges defined in the casing wall. At least ten bladed elements may be defined in the casing wall. Five bladed elements may have a depth greater than the other five bladed elements. Five bladed elements may have a width greater than the other five bladed elements. The bladed elements may be spaced equidistant from one another. The bladed elements may be defined in the casing wall on a hub side of the impeller. The bladed elements may be defined in the casing wall on a cover side of the impeller. At least sixteen bladed elements may be defined in the casing wall with a specific harmonic mistuning pattern.

In another aspect, up to one less than four times "n" bladed elements may be defined in the casing wall, where "n" is the n-diameter cavity mode that is to be mistuned. The bladed elements may be defined in the casing wall on a hub side of the impeller. The bladed elements may be defined in the casing wall on a cover side of the impeller. The bladed elements may vary in a linear pattern from minimum to maximum size around the circumference to mistune the cavities to minimize acoustic pulsations in the cavity. In another aspect, the number of bladed elements can be selected from two up to one less than 2×"n". For example, if the mode is a 5-diameter mode, then (2 n-1) or nine bladed elements can be selected to mitigate or eliminate the 5-diameter mode within the area containing the bladed elements.

If needed, the nine vanes can still be mistuned to give a 2×"n" harmonic or other mistuning pattern to reduce noise and/or impeller vibration.

This invention is also defined by the following clauses:

Clause 1: An arrangement for intentionally mistuning a cavity formed adjacent an impeller hub and/or another cavity formed when an impeller cover is provided in a turbomachine having "n"-diameter acoustic modes, the arrangement comprising: at least two bladed elements defined within a perimeter of a casing wall adjacent a hub side of the impeller, wherein the bladed elements are configured to mistune the cavities to minimize acoustic pulsations in the cavity.

Clause 2: The arrangement as recited in Clause 1, wherein the bladed elements are grooves or ridges defined in the casing wall.

Clause 3: The arrangement as recited in Clause 2, wherein at least ten bladed elements are defined in the casing wall.

Clause 4: The arrangement as recited in Clause 3, wherein two times "n" bladed elements have a depth greater than the other two times "n" bladed elements.

Clause 5: The arrangement as recited in Clause 3 or 4, wherein two times "n" bladed elements have a width greater than the other two times "n" bladed elements.

Clause 6: The arrangement as recited in any of Clauses 2-5, wherein the bladed elements are spaced equidistant from one another.

Clause 7: The arrangement as recited in any of Clauses 1-6, wherein the bladed elements are defined in the casing wall on a cover side of the impeller.

Clause 8: The arrangement as recited in any of Clauses 1-7, wherein the bladed elements are provided in at least one of in-phase and out-of-phase with one another in the casing wall and/or at least one of in-phase and out-of-phase on the sides of the impeller hub and a cover.

Clause 9: The arrangement as recited in any of Clauses 2-8, wherein at least eight bladed elements are defined in the casing wall with a specific harmonic mistuning pattern.

Clause 10: The arrangement as recited in any of Clauses 1-9, wherein (2 n-1) bladed elements are defined in one or more of the cavities with or without a mistuning pattern.

Clause 11: The arrangement as recited in any of Clauses 1-10, wherein bladed elements are defined in one or more of the cavities to mistune an acoustic mode with opposite phase to the structural mode of the rotating element.

Clause 12: A turbomachine having "n"-diameter acoustic modes, comprising: a casing having an inlet end opposite an outlet end along a longitudinal axis of the casing; a shaft assembly provided within the casing, the shaft assembly extending from the inlet end to the outlet end; a rotor having a plurality of rotating impellers with or without covers extending radially outward from the shaft assembly; and at least two bladed elements defined within a perimeter of the casing adjacent one of the impellers on a hub side of the casing, wherein the bladed elements are configured to mistune at least one cavity adjacent to the impeller to minimize acoustic pulsations in the cavity.

Clause 13: The turbomachine as recited in Clause 12, wherein the bladed elements are grooves or ridges defined in the casing wall.

Clause 14: The turbomachine as recited in Clause 13, wherein at least four times "n" bladed elements are defined in the casing wall.

Clause 15: The turbomachine as recited in Clause 14, wherein two times "n" bladed elements have a depth greater than the other two times "n" bladed elements.

Clause 16: The turbomachine as recited in Clause 14 or 15, wherein two times "n" bladed elements have a width greater than the other two times "n" bladed elements.

Clause 17: The turbomachine as recited in any of Clauses 13-16, wherein the bladed elements are spaced equidistant from one another.

Clause 18: The turbomachine as recited in any of Clauses 12-17, wherein the bladed elements are defined in the casing wall on a hub side of the impeller.

Clause 19: The turbomachine as recited in any of Clauses 12-18, wherein the bladed elements are defined in the casing wall on a cover side of the impeller.

Clause 20: The turbomachine as recited in any of Clauses 12-19, wherein the bladed elements are provided in at least one of in-phase and out-of-phase with one another in the casing wall and/or at least one of in-phase and out-of-phase on the sides of the impeller hub and a cover.

Clause 21: The turbomachine as recited in any of Clauses 13-20, wherein at least eight bladed elements are defined in the casing wall.

Clause 22: A cavity in a gas- or liquid-handling mechanism with mistuning modifications as recited in any of Clauses 1-11.

These and other features and characteristics of the turbomachine, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE DISCLOSURE

Figure 1:
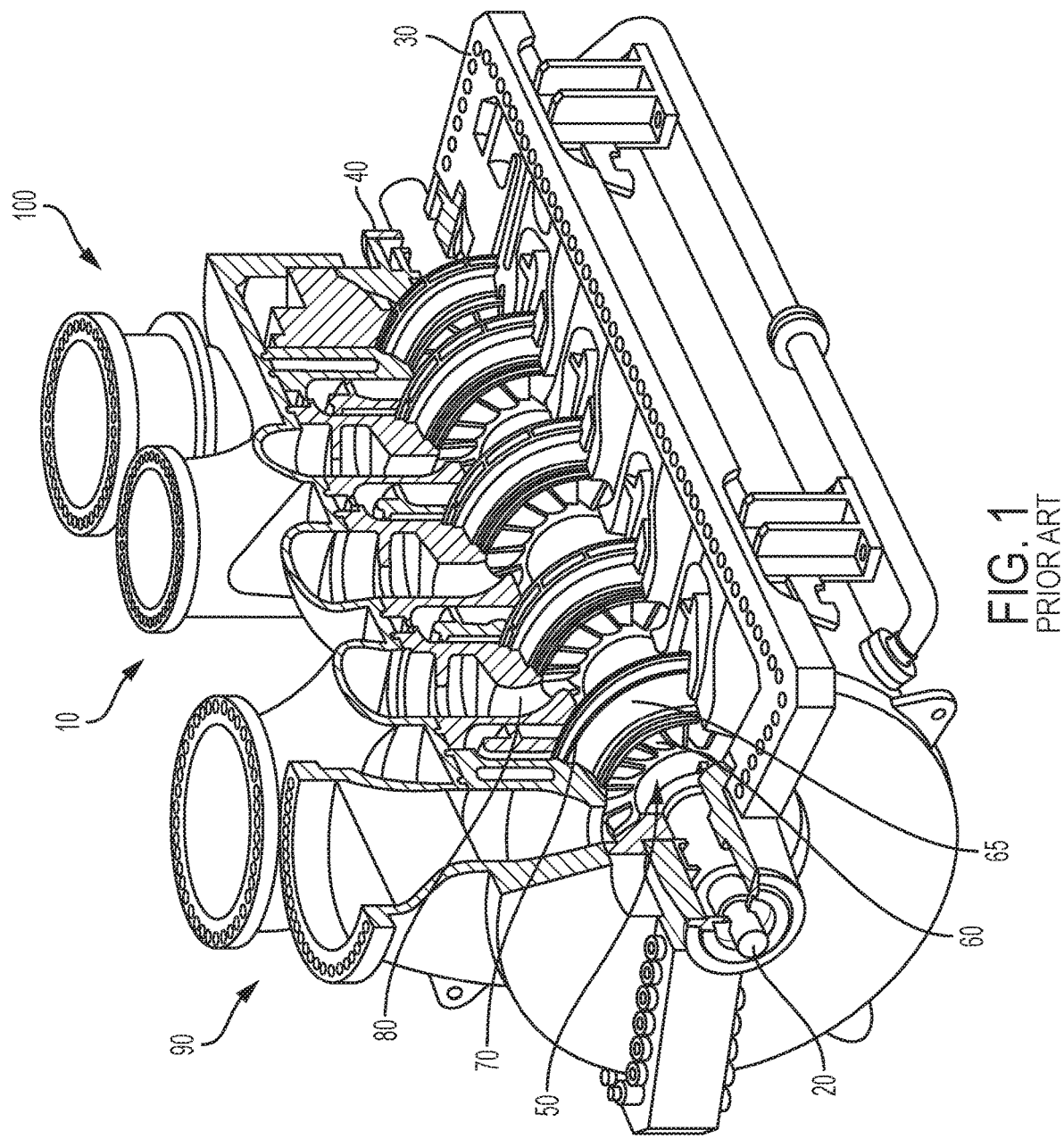
FIG. 1 is a partial-cutaway perspective view of a multi-stage, centrifugal-flow turbomachine in accordance with a prior art embodiment.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As described above, rotating blades or impellers 60 in a conventional turbomachine 10 are excited into resonant vibrations by a) upstream stator strut and/or vane wakes and potential flow interaction with downstream struts and vanes, b) other inhomogeneities in the flow stream formed by non-uniform circumferential pressure distribution, c) acoustic pulsations either at rotating blade passing frequency, multiples of blade passing frequency, and/or from vortex shedding from struts or vanes, in turn causing coincident acoustic resonance of the gas within the casing. Rotating blades or impellers 60 can be excited to a large amplitude when a blade modal frequency corresponds to the shaft rotational frequency multiplied by the harmonic number of the flow inhomogeneity seen by the rotating blade or impeller 60.

The present disclosure is directed to a method of reducing cavity noise to both reduce noise signature, as well as potential excitation of adjacent bladed disks or impellers from acoustic pressure pulsations. The method considers cavities adjacent the impeller as equivalent gas-filled disks with boundary conditions at the sides and ends of the cavities. Acoustic modes within cavities are affected by the swirling flow of the gas within the cavities, differently on the cover side versus the hub side of the turbomachine. By adding blade-like elements to replace the basic smooth boundaries of the cavities, an effective disk with blades can be modified with intentional mistuning to greatly reduce the response of vibratory modes of the gas in the cavities.

Figure 2:
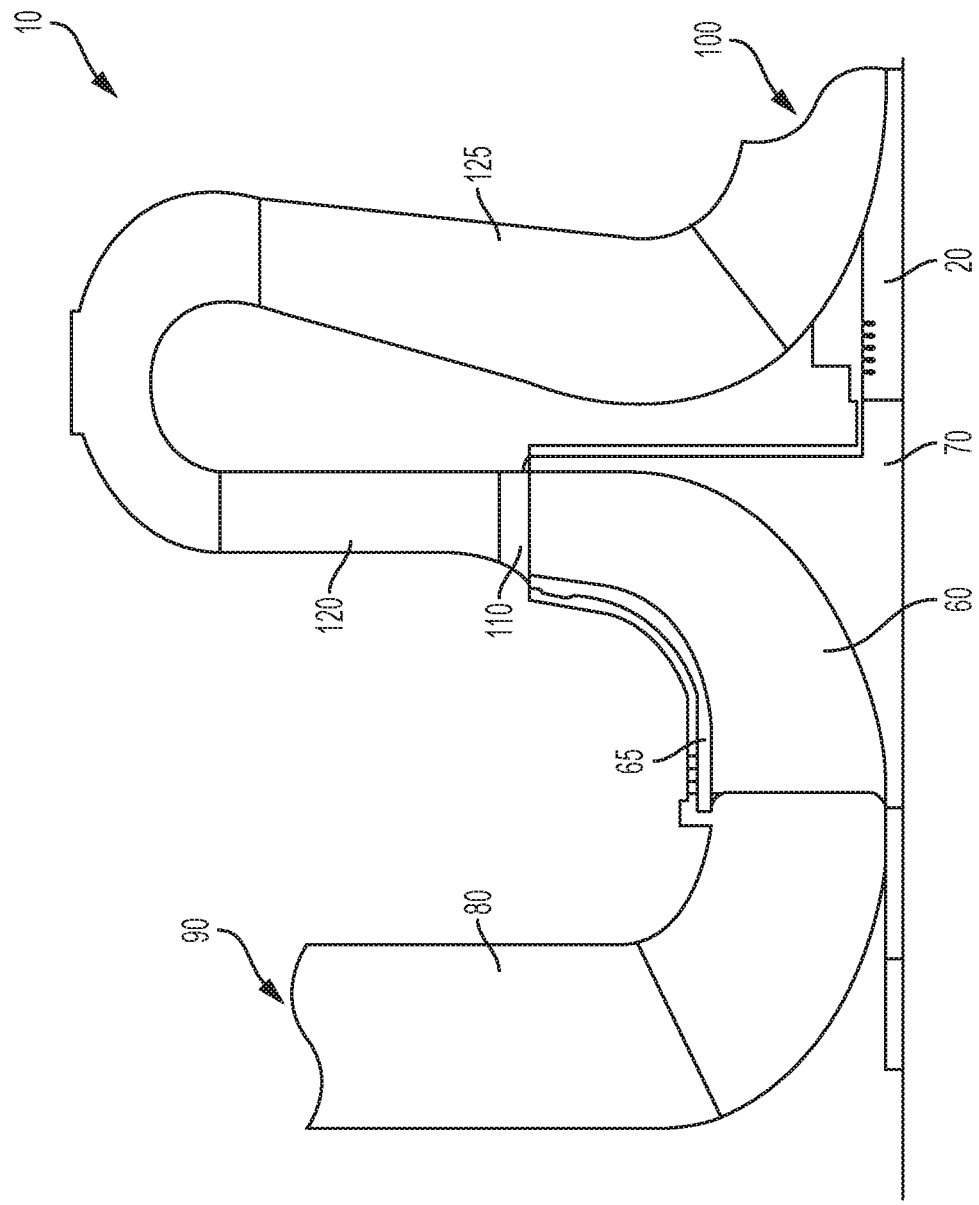
FIG. 2 is a schematic cross-sectional view of one stage of the turbomachine shown in FIG. 1.
Figure 3:
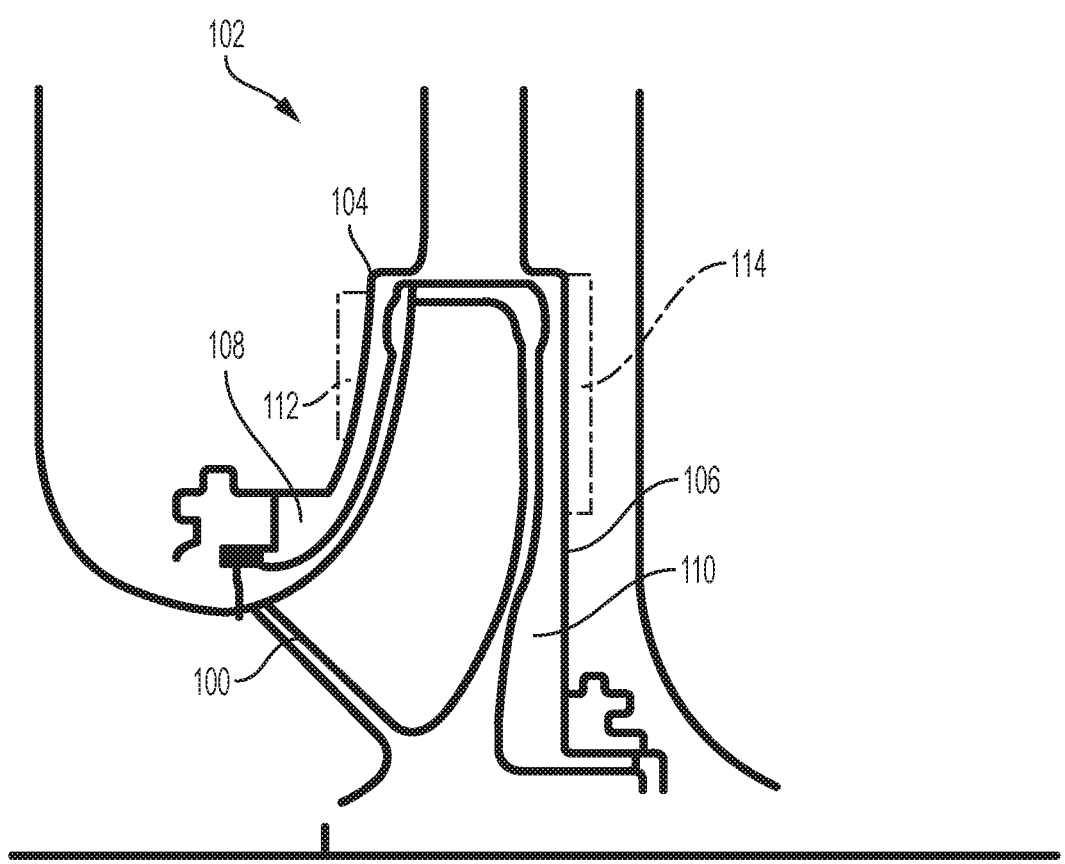
FIG. 3 is a schematic cross-sectional view of one stage of a turbomachine according to the present disclosure.

With reference to FIG. 3, an impeller 100 is housed within a casing 102 within a turbomachine, such as the turbomachine 10 shown in FIGS. 1 and 2. FIG. 3 illustrates a single stage of a turbomachine; however, one of ordinary skill in the art will understand that specific components illustrated in FIG. 3 can be easily adapted for use in multi-stage turbomachines, such as a multi-stage, centrifugal-flow compressor. A plurality of impellers 100 may be spaced apart in multiple stages along the axial length of the shaft. The impeller 100 is configured to rotate about the shaft during operation of the turbomachine. In one aspect, the impeller 100 is fixedly coupled to the shaft such that the impeller 100 rotates with the rotation of the shaft. The casing 102 may extend around a cover side 104 of the impeller 100 and a hub side 106 of the impeller 100. It is also contemplated that a cover may not be provided with the turbomachine, thereby providing an "open" impeller configuration. A first cavity 108 is defined on the cover side 104 of the impeller 100 and a second cavity 110 is defined on the hub side 106 of the impeller 100. In one aspect, the cavities 108, 110 are considered to be equivalent to gas-filled disks provided on the sides of the impeller 100. In one aspect, at least one cavity 108, 110 is modified so that the surface boundaries of the gas contained within the cavity 108, 110 has blade-like elements 112, 114. In another aspect, both cavities 108, 110 are modified so that the surface boundaries of the contained gas within the cavities 108, 110 have blade-like elements 112, 114 (also referred to as "bladed elements"). In one aspect, the blade-like elements 112, 114 are non-axisymmetric blade-like elements.

Figure 6:
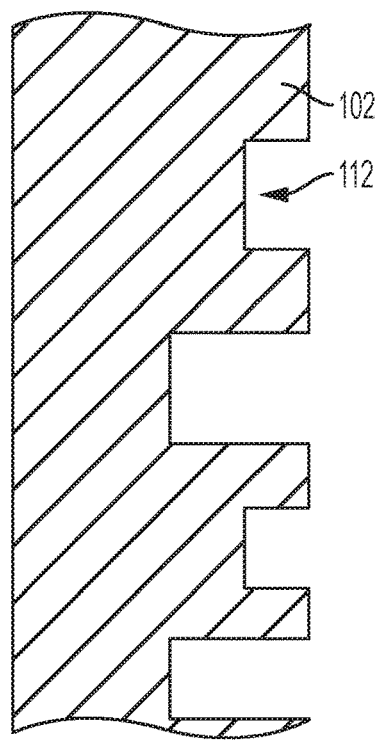
FIG. 6 is a cross-sectional view of the casing wall of FIG. 3 showing a configuration of the blade-like elements according to an aspect of the disclosure.
Figure 7:
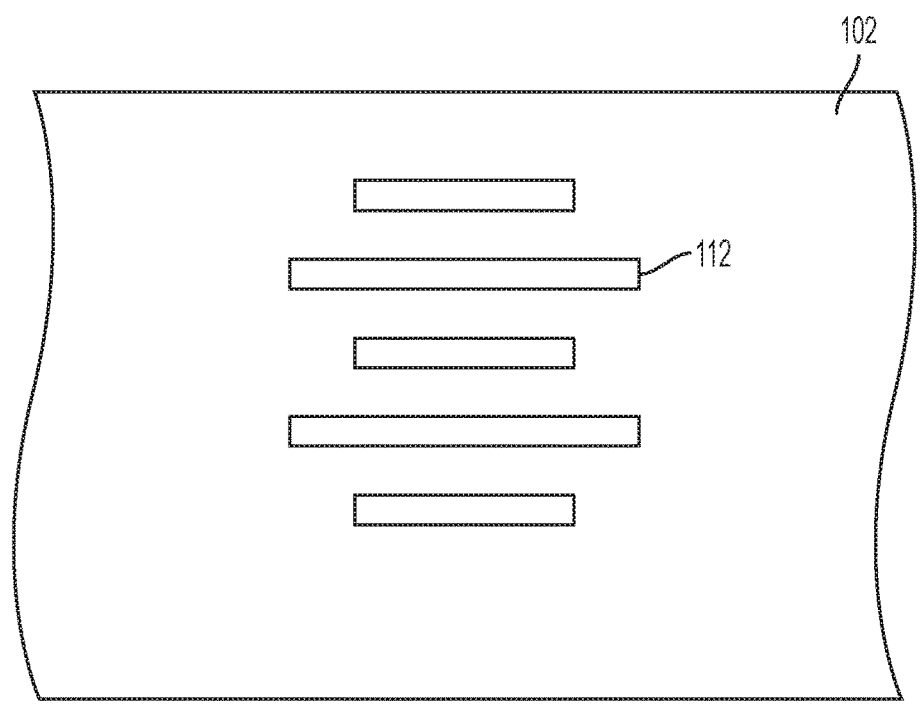
FIG. 7 is a front view of the casing wall of FIG. 3 showing another configuration of the blade-like elements according to an aspect of the disclosure.
Figure 8:
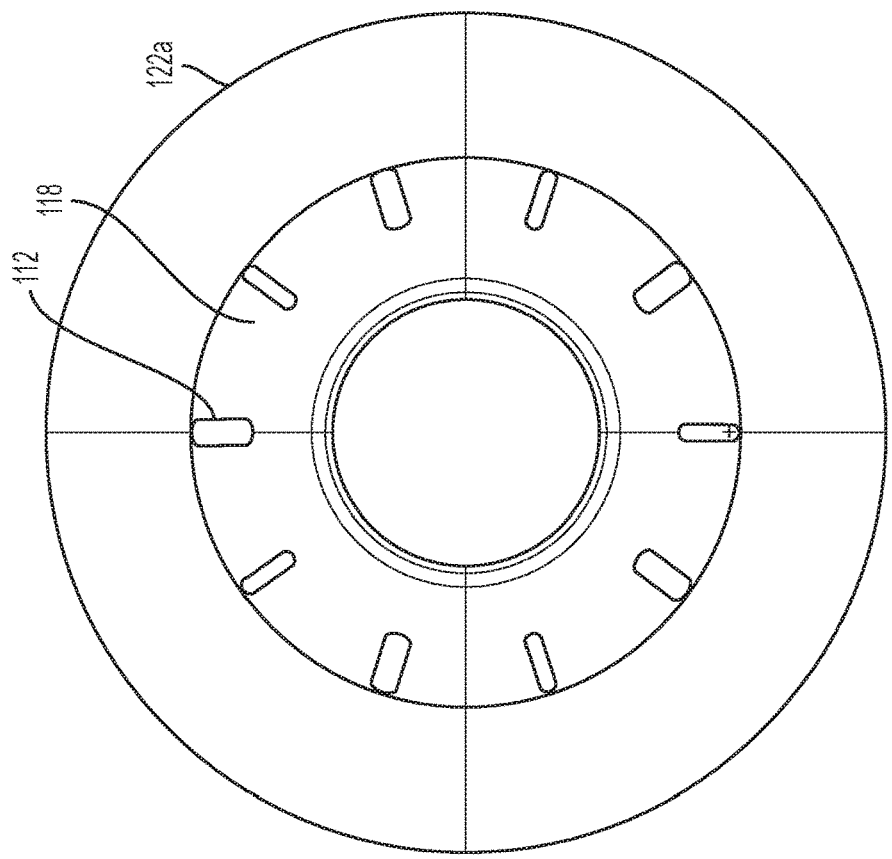
FIG. 8 is a front view of a casing wall including a ten slot arrangement.

With reference to FIG. 3, in one aspect, the blade-like elements 112, 114 are grooves and/or ridges spaced around the circumference of the cavities 108, 110. In another aspect, the blade-like elements 112, 114 may be ribs that extend into the cavity. In another aspect, a machining process produces a wave-like length (also referred to as a scallop shape) that is spaced and subsequently modified to give a desired number of effective mistuned elements in the cavities 108, 110 to greatly reduce the response of vibratory modes of the gas in the cavities 108, 110. The number of blade-like elements 112, 114 can be chosen in order to apply desired variations to reduce a response of a particular diameter mode or modes. When referring to a diameter mode, it to be understood to mean a configuration of high acoustic pressure pulsations separated by areas having low acoustic pressure pulsations. For example, a 5-diameter acoustic mode would have five areas with high acoustic pressure pulsations alternating with five areas having low acoustic pressure pulsations. Therefore, with reference to FIG. 8, five of the blade-like elements 112 may have a high acoustic pressure pulsation and the adjacent blade-like elements 112 may have low acoustic pressure pulsations. For example, a 5-diameter acoustic mode of the gases within the cavities 108, 110 could be resonant with 15 times the operating speed, the impeller rotating blade passing frequency. The spinning modes for blade passing frequency could have five lobes due to 15 impellers interacting with 20 inlet vanes 80 or 20 diffuser vanes 120. With a spinning acoustic mode at frequency $\omega$ with "n" patterns, there may be a variation of pressure in the circumferential direction that is continuous and repeats every 2 $\pi$ radians, as defined by the cylindrical geometry. This pressure distribution rotates at ($\omega$/n) and generates, at every stationary point, a fluctuating pressure at frequency $\omega$. The pattern sweeps the cavity annulus walls at a velocity (r×$\omega$/n), in which r is the radius of the cavity. One or both of the cavities 108, 110 on the cover side 104 and the hub side 106 could have 10 equally-distant blade-like elements 112, 114, such as grooves and/or ridges, machined in the vertical walls of the casing 102. It is also contemplated that alternative degrees of separation between the blade-like elements 112, 114 may be used. Intentional mistuning can then be selected to give, for example, a 10-diameter mismatch pattern to greatly reduce the response of vibratory modes of the gas in the cavities 108, 110. In one aspect, to provide the intentional mistuning, a pattern with 20 blade-like elements 112, 114, such as grooves and/or ridges, would give a 10-diameter pattern or, alternatively, could have every second groove in the pattern twice as deep and/or wide as the adjacent groove, as shown in FIGS. 6 and 7. It is to be understood that the configuration of the blade-like elements 112 shown in FIGS. 6 and 7 can also be used for the blade-like elements 114 on the hub side 106 of the impeller 100. In another aspect, the configuration of the blade-like elements 112 on the cover side 104 of the impeller 100 could be different from the configuration of the blade-like elements 114 on the hub side 106 of the impeller 100. In another aspect, a pattern could have 20 blade-like elements 112, 114, such as grooves, ridges, and/or scallop shapes. Using these patterns of blade-like elements 112, 114, acoustic pulsations are reduced and impeller response at 20 times speed is minimized.

Figure 9:
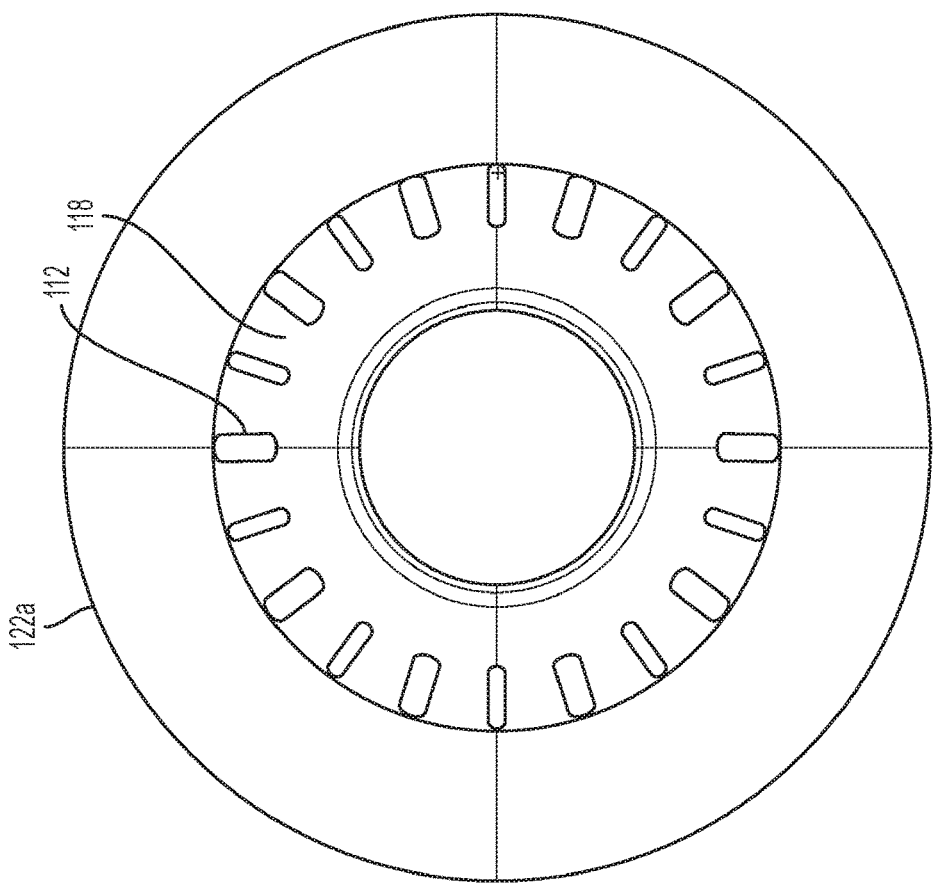
FIG. 9 is a front view of a casing wall including a twenty slot arrangement.

If needed, the number of blade-like elements 112, 114 to mistune may be chosen depending on whether the harmonic of the stationary vanes is greater than or less than the harmonic of the rotating blades. In an example where the harmonic of vanes is greater than the harmonic of the blades passing by with 2×"n" blade-like elements 112, 114, the spinning modes due to interaction with the rotating blade passing frequency will rotate in an opposite direction to that from the stationary vanes and cancel some of the pulsations. For example, if the 5-diameter mode is due to the difference of 20 stationary vanes and 15 rotating blades, then 10 blade-like elements 112, 114 would be used so that spinning modes would be in an opposite direction from those for the 20 stationary vanes. The acoustic pulsations due to the blade-like elements 112, 114 would counter those caused by the vanes. In an example where the number of stationary vanes is less than the number of rotating blades, four times "n" blade-like elements 112, 114 would be used. For example, if the 5-diameter mode is due to the difference of 10 stationary vanes and 15 rotating blades, 20 blade-like elements 112, 114 would be used so that spinning modes would rotate in opposite directions from those for the ten stationary vanes. The acoustic pulsations due to blade-like elements 112, 114 would counter those caused by the vanes. As an example of the present disclosure, shown in FIG. 8, the blade-like elements 112 may be milled into the upstream and downstream diaphragms on the surface of the cavity between the diaphragm and the impeller. In this example, ten blade-like elements 112 are spaced equally around the circumference. In this example, five larger blade-like elements 112 are spaced 72 degrees apart from one another. Smaller blade-like elements 112 are spaced equally between each of the larger blade-like elements 112. Each blade-like element 112 may be 1.25 inches in length located at an inner radius of 4.875 inches. The larger blade-like elements 112 may be 0.5 inches wide and 0.25 inches deep. The smaller blade-like elements 112 may be 0.25 inches wide and 0.125 inches in depth. FIG. 9 a similar arrangement of blade-like elements 112. However, this arrangement includes twenty blade-like elements 112, including ten larger blade-like elements 112 and ten smaller blade-like elements 112. It is also to be understood that the blade-like elements 114 may be arranged in similar arrangements as described above.

In another aspect, by including the blade-like elements 112, 114 within one of the cavities 108, 110, concern for circular modes are eliminated by having a different number of blade-like elements 112, 114 than the rotating blades in the adjacent disk. Even 1-diameter modes that are of less concern structurally could have blade-like elements 112, 114 to reduce acoustic pulsations. In other aspects, the blade passing frequency pulsations at the sides of the disks excite plate modes with high motion near the outer diameter of the disk. In this aspect, the blade-like elements 112, 114 within the cavities 108, 110 are spaced and modified depending on the relative phase angles of the acoustic pulsations versus the plate mode.

Modifications to one or both of the cavities 108, 110 can be separate to reduce response of disks to one or more gas modes, but the modifications can also be in addition to structural bladed disk mistuning as is used in the prior art for even greater reliability. In particular, along with the blade-like elements 112, 114 provided on the casing 102, similar blade-like elements, such as grooves, ridges, and/or scallop-shaped protrusions, could be provided on the disk or cover 65 of the impeller 100 facing the cavities 108, 110 to further reduce response. Alternatively, these could serve as the blade-like elements that mistune the adjacent fluid-filled cavities. It is to be understood that the term "fluid" used throughout this description encompasses gases, liquids, and gas/liquid mixtures. Acoustic modes would thus be affected by changes in the swirling flow of the gas within the cavities, differently on the cover side versus the hub side of the turbomachine. Cavity modifications could use direct machining and/or welding to form the blade-like element 112, 114 on the casing 102 or utilize inserts that can be installed and replaced in the cavities 108, 110 if needed. The blade-like elements 112, 114 may be worn down during use of the turbomachine and may need to be reformed or redefined. It is also contemplated that further blade-like elements could be added to the cavities 108, 110 to have other function within the cavities 108, 110, such as reducing swirl of flow into seals in the turbomachine, reducing thrust load, or reducing flow point when the compressor or turbomachine stall begins at the impeller tip or diffuser entrance.

In other aspects, beside compressor impellers, the blade-like element arrangement may be used to mistune any cavity or annulus that has diametrical mode shapes or other pattern pressure pulsation frequency, excited by various sources, alleviating concern for structures, including rotating and stationary components, and/or environmental noise issues. Similar liquid-handling pumps, axial compressors, fans, as well as steam or gas turbines, are turbomachines that could utilize this disclosed method. Other potential applications for the mistuned blade-like element arrangement to reduce response of acoustic modes include fluid-handling including air mechanisms, such as engines, machinery, fuel cells, piping, ducts, diffusers, nozzles, valves, silencers, mufflers, seals, heat exchangers, airframes, tires and wheels, rockets, combustion chambers, vehicles, speakers, and double-pane windows.

Figure 4:
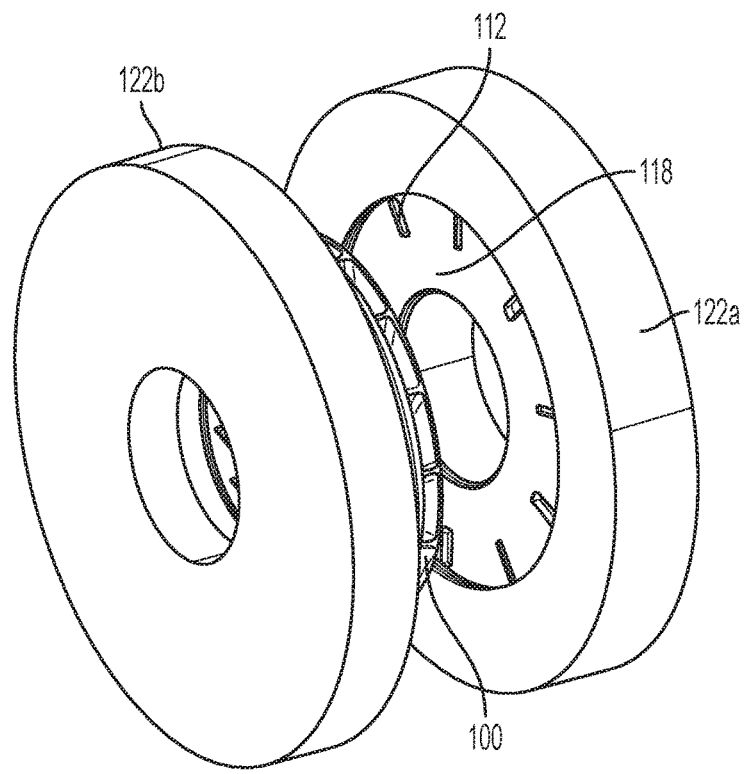
FIG. 4 is a front perspective view of an impeller and a cover disk according to the present disclosure.
Figure 5:
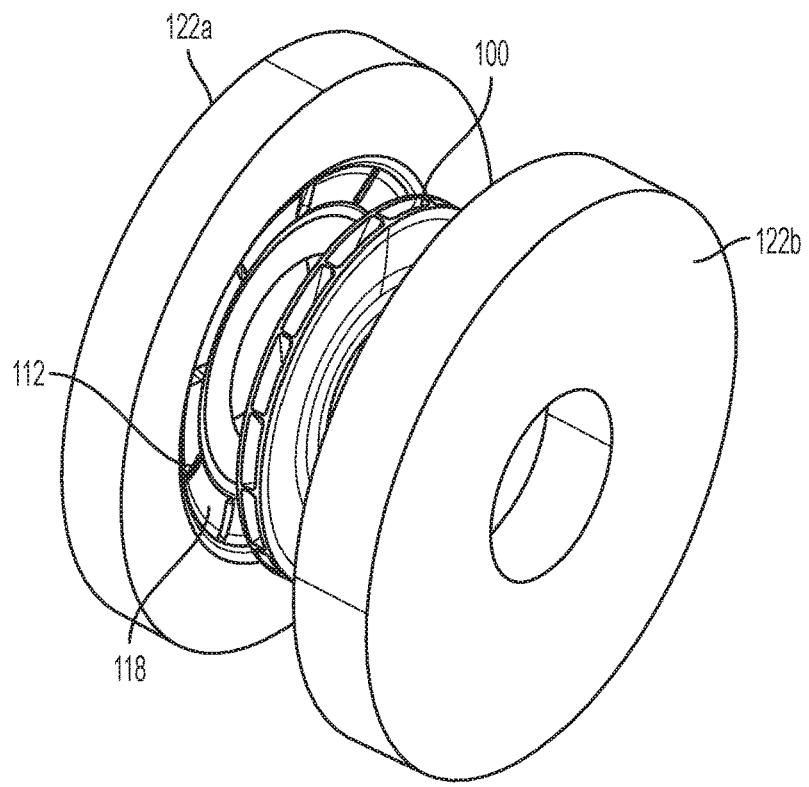
FIG. 5 is a rear perspective view of the impeller and the cover disk of FIG. 4.

With reference to FIGS. 4 and 5, blade-like elements 112 are defined in a diaphragm wall 118 adjacent to a cover disk 120 on the cover side of the impeller 100 in the turbomachine. In one aspect, two diaphragms 122a, 122b define cavities to receive the impeller 100. The blade-like elements 112 may be defined in the diaphragm wall 118 of one or both of the diaphragms 122a, 122b. One or more blade-like elements 116 are circumferentially spaced around the diaphragm wall 118. In another aspect, 20 blade-like elements 112 are defined in each diaphragm 122a, 122b at the sides of the impeller 100. In one aspect, the blade-like elements 112 are separated 18 degrees apart from one another. As some acoustic modes are coupled to one another, both cavities and/or the impeller sides could have blade-like elements that are located out-of-phase with each other to provide additional mistuning.

While several aspects of the turbomachine and blade-like elements are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. An arrangement for intentionally mistuning a cavity formed adjacent an impeller hub and/or another cavity formed when an impeller cover is provided in a turbomachine having "n"-diameter acoustic modes, the arrangement comprising:

at least two bladed elements defined within a perimeter of a casing wall adjacent a hub side of an impeller,
wherein the at least two bladed elements are configured to mistune the cavity formed adjacent the impeller hub and/or the other cavity when the impeller cover is provided to minimize acoustic pulsations in the cavity formed adjacent the impeller hub and/or the other cavity when the impeller cover is provided, wherein (2n-1) bladed elements of the at least two bladed elements are defined in one or more of the cavities with or without a mistuning pattern.

2. The arrangement as claimed in claim 1, wherein the at least two bladed elements are grooves or ridges defined in the casing wall.

3. The arrangement as claimed in claim 2, wherein the at least two bladed elements comprises at least ten bladed elements defined in the casing wall with a specific harmonic mistuning pattern.

4. The arrangement as claimed in claim 3, wherein two times "n" bladed elements of the at least two bladed elements have a depth greater than the other two times "n" bladed elements of the at least two bladed elements.

5. The arrangement as claimed in claim 3, wherein two times "n" bladed elements of the at least two bladed elements have a width greater than the other two times "n" bladed elements of the at least two bladed elements.

6. The arrangement as claimed in claim 2, wherein the at least two bladed elements are spaced equidistant from one another.

7. The arrangement as claimed in claim 1, wherein additional bladed elements are defined in the casing wall on a cover side of the impeller.

8. The arrangement as claimed in claim 1, wherein the at least two bladed elements are provided in at least one of in-phase and out-of-phase with one another in the casing wall and/or at least one of in-phase and out-of-phase on sides of the impeller hub and a cover.

9. The arrangement as claimed in claim 2, wherein the at least two bladed elements comprise at least eight bladed elements are defined in the casing wall with a specific harmonic mistuning pattern.

10. The arrangement as claimed in claim 1, wherein the at least two bladed elements are defined in the cavity formed adjacent the impeller hub and/or the other cavity when the impeller cover is provided to mistune an acoustic mode with opposite phase to a structural mode of the impeller.

11. A turbomachine having "n"-diameter acoustic modes, comprising:

a casing having an inlet end opposite an outlet end along a longitudinal axis of the casing;

a shaft assembly provided within the casing, the shaft assembly extending from the inlet end to the outlet end;

a rotor having a plurality of rotating impellers with or without covers extending radially outward from the shaft assembly; and at least two bladed elements defined within a perimeter of the casing on a hub side of the casing adjacent one of the plurality of rotating impellers, wherein the at least two bladed elements are configured to mistune at least one cavity adjacent to one of the plurality of rotating impellers to minimize acoustic pulsations in the at least one cavity, wherein the at least two bladed elements are grooves or ridges defined in a wall of the casing, and wherein the at least two bladed elements comprise at least four times "n" bladed elements that are defined in the wall of the casing with a specific harmonic mistuning pattern.

12. The turbomachine as claimed in claim 11, wherein two times "n" bladed elements of the at least two bladed elements have a depth greater than the other two times "n" bladed elements of the at least two bladed elements.

13. The turbomachine as claimed in claim 11, wherein two times "n" bladed elements of the at least two bladed elements have a width greater than the other two times "n" bladed elements of the at least two bladed elements.

14. The turbomachine as claimed in claim 11, wherein the at least two bladed elements are spaced equidistant from one another.

15. The turbomachine as claimed in claim 11, wherein the at least two bladed elements are defined in a wall of the casing on a hub side of one of the plurality of rotating impellers.

16. The turbomachine as claimed in claim 11, wherein the at least two bladed elements are defined in a wall of the casing on a cover side of one of the plurality of rotating impellers.

17. The turbomachine as claimed in claim 11, wherein the at least two bladed elements are provided in at least one of in-phase and out-of-phase with one another in a wall of the casing and/or at least one of in-phase and out-of-phase on the sides of an impeller hub and a cover.

18. The turbomachine as claimed in claim 11, wherein the at least two bladed elements comprise at least eight bladed elements defined in a wall of the casing with a specific harmonic mistuning pattern.

19. A gas—or liquid-handling mechanism or device having the arrangement as claimed in claim 1.

* * * * *